Patented Mar. 26, 1946

2,397,205

UNITED STATES PATENT OFFICE 2,397,205

TERPENE DERIVATIVE

Alfred L. Rummelsburg, Wilmington, Del., assignor to Hercules Powder Company, Wilmington, Del., a corporation of Delaware No Drawing. Application December 23, 1941, Serial No. 424,141

21 Claims. (Cl. 260—67)

This invention relates to a new series of terpene-formaldehyde reaction products, also to a method for the production of these reaction products.

Pinene and d-limonene have heretofore been condensed with formaldehyde using sulfuric or glacial acetic acid as a catalyst. The mechanism of this condensation is rather obscure. However, it is known that the reaction product is not a single terpene compound but is a crude mixture containing substantial quantities of compounds containing ether linkages and to a greater extent hydroxyl groups. Due to the presence of the hydroxyl group these reaction products can be esterified with mono- and polybasic acids to form many useful compounds. The rather low hydroxyl content of these formaldehyde reaction products, even following hydrogenation, however, acts as a detriment to their use in this manner.

Now, in accordance with this invention, it has been found that much more highly hydroxylated reaction products may be formed by reacting an acyclic terpene containing three double bonds per molecule with formaldehyde, preferably in contact with an acid catalyst which may be either an inorganic acid or an organic acid of between 1 and 8 carbon atoms. It has been found that in using an inorganic acid as catalyst for the reaction, a reaction product of relatively high hydroxylation results upon the removal of the catalyst and any excess formaldehyde. When, however, an organic acid is employed as catalyst, there is obtained simultaneously some esterification of the hydroxylated product first formed. Accordingly, this partially esterified product must be saponified to obtain a product having a high degree of hydroxylation.

In carrying out the process of the present invention, the desired acyclic terpene having three double bonds per molecule will be heated at a temperature between about 50° C. and about 275° C. with formaldehyde, preferably in the presence of an acid catalyst. The reaction mixture will then be treated to remove any catalyst and/or excess reactants including any inert solvent. This step will entail varying procedures depending upon the particular conditions at hand. Excess formaldehyde may be removed by water-washing as by washing the reaction mixture with hot inorganic acids. Many of the acid catalysts may be removed by water-washing, and excess acyclic terpene may be removed by vacuum distillation. The resulting product, if prepared using an organic acid as catalyst, will preferably be saponified to yield a product of higher hydroxyl content.

The following examples are given as illustrative of particular embodiments of the processes of this invention. These, however, are not to be considered as limiting the invention. All parts and percentages are by weight unless otherwise indicated.

Example 1

Seventy-five parts of 93% allo-ocimene, 100 parts of toluene, 40 parts of trioxymethylene, and 0.3 part of p-toluene sulfonic acid were refluxed for a period of 7 hours at 110° C. The homogeneous reaction mixture was water-washed to remove excess trioxymethylene and the acid catalyst. The toluene and any unreacted allo-ocimene was then removed by reduced pressure distillation employing a final bath temperature of 110° C. and a pressure of 15 mm. The residue was a viscous resin containing 3.0% OH as determined by acetylation. Catalytic hydrogenation of this material at 110–120° C. employing Raney nickel as a catalyst and methanol as a solvent increased the hydroxyl content to 10.6%.

Example 2

Seventy-five parts of 93% allo-ocimene, 100 parts of glacial acetic acid, and 40 parts of trioxymethylene were refluxed for a period of 7 hours at 110° C. The homogeneous reaction mixture was then water-washed to remove unreacted acetic acid and unreacted trioxymethylene. Unreacted allo-ocimene was removed by reduced pressure distillation employing a final bath temperature of 110° C. and a pressure of 15 mm. One hundred nineteen parts of a viscous resin remained which analyzed as follows: Acid number 0.0, saponification number 214, per cent OH 3.4. This product was then saponified with alcoholic sodium hydroxide to yield a product which was a viscous resin having a hydroxyl content of 12.1%.

Example 3

One hundred thirty-eight parts of 98% myrcene, 250 parts of aqueous formaldehyde and 45 parts of maleic anhydride were vigorously agitated in a glass-lined autoclave at 150–160° C. for a period of 5 hours. The reaction mixture was washed with water at 80° C. and distilled at 20 mm. pressure using a final bath temperature of 110° C. to remove unreacted constituents. A resinous solid having a hydroxyl content of 8% and a drop melting point of 60° C. was obtained in the amount of 80 parts.

Example 4

One hundred thirty-eight parts of allo-ocimene and 260 parts of an aqueous formaldehyde solution containing 40% formaldehyde, were heated to 225° C. with agitation for a period of 4 hours in a stainless steel autoclave. The reaction mixture was then washed with water at 80° C. and distilled at 20 mm. pressure using a final bath temperature of 110° C. to remove unreacted constituents. Eighty-five parts of a soft resin having a drop melting point of 65° C. and a hydroxyl content of 7.5% remained as a product.

Although allo-ocimene and myrcene were the particular materials employed in the examples, any acyclic terpene having three double bonds per molecule, as for example, allo-ocimene, ocimene, myrcene, etc., may be employed. In particular, allo-ocimene is preferred inasmuch as, in addition to having three double bonds per molecule, this compound has the double bonds in a triply conjugated arrangement. Hereinafter, in this specification, an acyclic terpene having three double bonds per molecule will be referred to for convenience merely as an acyclic terpene.

A substantially pure allo-ocimene has been employed in the illustrative examples. However, it will be understood that in carrying out this invention in its broadest aspects, the acyclic terpene may be utilized in a substantially pure state or in an admixture with other terpenes, which admixture, contains substantial quantities of the acyclic terpene. For example, an impure allo-ocimene to which the present processes may be applied is that obtained by the pyrolysis of $\alpha$-pinene. It has been found that when $\alpha$-pinene is pyrolyzed under suitable conditions of temperature and contact time of the vapor with the reaction tube, there is produced a substantial quantity of allo-ocimene, in addition to dipentene and other terpenes in quantities determined by the conditions of reaction. This method is described in detail in the application for U. S. Letters Patent by A. L. Rummelsburg, Serial No. 393,241, filed May 13, 1941. In addition, the pyrolysis of $\beta$-pinene at say 400° C. yields as much as 67% myrcene in conjunction with other terpenes. Any of such acyclic terpene containing mixtures may be employed in accordance with this invention.

In the illustrative embodiments, formaldehyde in several different forms has been employed; however, any monomeric or polymeric variety of formaldehyde may be employed as desired. Additional polymeric varieties which are suitable are paraformaldehyde, etc. If monomeric formaldehyde is employed, it may be used in the form of an aqueous solution, as for example, commercial 35 to 40% formaldehyde. However, with the use of aqueous formaldehyde, it is much preferred to employ an inorganic acid as a catalyst for the reaction. If desired, gaseous monomeric formaldehyde may be employed in lieu of the aqueous formaldehyde solution. With the use of gaseous or aqueous formaldehyde, operating at temperatures of say 100° C. or higher, a closed system for the reactants will be found desirable.

As stated hereinbefore, any inorganic acid may be employed as a catalyst for the reaction, or as desired any organic acid of between 1 and 8 carbon atoms. Accordingly, monobasic inorganic acids, such as, the hydrogen halides, as hydrochloric, hydrofluoric, hydrobromic, hydriodic, etc.; oxy-acids, as perchloric, periodic, chloric, bromic, iodic, chlorous, bromous, iodous, hypochloric, nitric, nitrous, etc.; aromatic sulfonic acids, as p-toluene sulfonic acid, benzene sulfonic acid, benzene disulfonic acid, naphthalene disulfonic acid, etc.; aliphatic sulfonic acids, as ethyl sulfonic acid, propyl sulfonic acid, butyl sulfonic acid, etc. may be employed. Inorganic polybasic acids, such as, sulfuric, sulfurous, phosphoric, phosphorous, boric, etc.; organic monobasic acids, such as, formic, acetic, propionic, butyric, valeric, caproic, etc.; organic polybasic acids, such as, oxalic, malonic, methyl malonic, succinic, glutaric, adipic, maleic, citraconic, mesaconic, itaconic, etc. acids may be employed. The anhydrides of the foregoing organic acids may be equivalently employed if desired, as well as certain anhydrides of the polybasic mineral acids, as for example, sulfur dioxide, etc.

While the use of a catalyst is normally necessary in accordance with this invention, a catalyst is not always required. For example, it is possible at a temperature between about 200° C. and about 275° C. to react monomeric or polymeric formaldehyde with an acyclic terpene without the use of any catalyst.

As illustrated by the examples, any inert, volatile, organic solvent for the reactants may be employed, if desired. Examples of such solvents are aromatic hydrocarbons, such as, benzene, toluene, xylene, cymene, etc.; aliphatic hydrocarbons, such as, gasoline, petroleum ether, V. M. & P. naphtha, butane, hexane, hydrogenated petroleum naphtha, cyclohexane, decahydronaphthalene, p-menthane, etc.; ethers, such as, dimethyl ether, diethyl ether, diisopropyl ether, etc.

In proceeding in accordance with the embodiments of the invention employing an acid catalyst, the reactants will be heated at a temperature between about 50° C. and about 275° C., preferably between about 80° C. and about 120° C. The reaction time employed may vary greatly and will be dependent upon many factors such as the degree of hydroxylation desired in the final product, etc. However, generally between about 1 hour and about 100 hours, preferably between about 6 hours and about 12 hours, will be the extent of the reaction period.

In the examples, the approximate molar ratio of acyclic terpene to formaldehyde was 1 to 3 (considering CH₂O as one molecule). This has in general, been found to give the best results particularly from the point of view of getting products of high hydroxyl content. Greater or lesser amounts of formaldehyde may be employed. With the use of lesser amounts, however, products of lower hydroxyl content but having higher ethylenic unsaturation result. When the reaction is carried out utilizing an inorganic acid catalyst, the catalyst will preferably be present in an amount between about 0.001% and about 1.0% on the basis of the total reactants. The quantity of organic acid catalyst may vary similarly when no appreciable ester formation is desired. However, the use of much more organic acid, and preferably at least an equi-molar proportion of organic acid on the basis of the acyclic terpene, is necessary where ester formation is desired.

It will be realized by reviewing the examples that when an excess of organic acid is employed and the resulting product saponified, the final hydroxylated product separated has a much higher hydroxyl value than the product obtained under conditions whereby no appreciable esterification is allowed to take place. The result has been found to be the general rule in accordance with the herein described processes.

The step of removing the catalyst and any unreacted constituents of the reaction mixture has been amply illustrated by the examples and will vary considerably depending upon the catalyst employed, the type of formaldehyde, etc. In the case of the partially esterified product, the final step will consist of saponification with, for example, potassium hydroxide, sodium hydroxide, etc. to obtain the hydroxylated condensate.

The acyclic terpene-formaldehyde condensates prepared in accordance with this invention are complex mixtures. Some of the individual compounds making up the condensate are monohydric alcohols, others polyhydric alcohols, still others have ether linkages, theoretically some of the compounds may contain ether linkages and hydroxyl groups. It is impossible to separate these various compounds by the methods presently available. However, these condensates react as an alcohol and are consequently extremely valuable as such. Thus, they may be esterified with mono- and polybasic acids to yield resins which may be advantageously employed in emulsions for textile finishes. These esters vary from soft to hard resins and may be employed in protective coatings and as insecticide intermediates. The hydroxylated condensates themselves are useful as softening agents in the processing of textiles. They can be used to much greater advantage than the prior art condensates since they have definitely higher hydroxyl contents. As a consequence, they possess greater reactivity with mono- and polybasic acids and also greater solubility in water.

The hydroxylated condensates prepared in accordance with the invention are unsaturated and may be catalytically hydrogenated using, for example, base metal, noble metal or copper chromite-type catalysts. Catalytic hydrogenation, in addition to reducing the olefinic unsaturation, accomplishes the decomposition of some of the ether groups formed in the condensation, with the resulting formation of products having a high hydroxyl content. These products have a definitely higher hydroxyl content than those resulting from the condensation of cyclic terpenes with formaldehyde and subsequent hydrogenation. This is so regardless of whether or not an excess of acid is employed in the condensation such that some esterification takes place. The hydrogenated acyclic terpene-formaldehyde condensates possess substantially increased stability to heat and chemical reaction as compared with the unhydrogenated products. Otherwise, the two materials have similar characteristics and uses.

What I claim and desire to protect by Letters Patent is:

1. The process which comprises heating an acyclic terpene hydrocarbon having three double bonds per molecule with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

2. The process which comprises heating an acyclic terpene hydrocarbon having three double bonds per molecule with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of an inorganic acid as a catalyst.

3. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of an unsubstituted organic carboxylic acid of between one and six carbon atoms.

4. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of an inorganic monobasic acid as a catalyst.

5. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a hydrogen halide as a catalyst.

6. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of hydrogen chloride as a catalyst.

7. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a monobasic carboxylic acid of between one and six carbon atoms.

8. The process which comprises heating an acyclic terpene hydrocarbon having three double bonds per molecule with an aldehyde, selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of acetic acid.

9. The process which comprises heating an acyclic terpene hydrocarbon having three double bonds per molecule with trioxymethylene, in a molar ratio, the reaction being carried out at a temperature between about 50° C. and about 275° C. in the presence of acetic acid as a catalyst.

10. The process which comprises heating alloocimene with trioxymethylene, in a molar ratio, the reaction being carried out at a temperature between about 50° C. and about 275° C. in the presence of acetic acid as a catalyst.

11. The process which comprises heating an acyclic terpene hydrocarbon having three double bonds per molecule with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of paratoluene sulfonic acid as a catalyst.

12. The process which comprises heating an acyclic terpene hydrocarbon having three double bonds per molecule with trioxymethylene, in a molar ratio, the reaction being carried out at a temperature between 50° C. and about 275° C. in the presence of para-toluene sulfonic acid as a catalyst.

13. The process which comprises heating allo-ocimene with trioxymethylene, in a molar ratio, the reaction being carried out at a temperature between about 50° C. and about 275° C. in the presence of para-toluene sulfonic acid as a catalyst.

14. A resinous reaction product resulting from the process which comprises heating an acyclic terpene hydrocarbon having three double bonds per molecule with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

15. A resinous reaction product resulting from the process which comprises heating myrcene with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

16. A resinous reaction product resulting from the process which comprises heating myrcene with trioxymethylene in a molar ratio, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

17. A resinous reaction product resulting from the process which comprises heating myrcene with trioxymethylene in a molar ratio, the reaction being carried out at a temperature between about 50° C. and about 275° C. in the presence of hydrogen chloride as a catalyst.

18. A resinous reaction product resulting from the process which comprises heating allo-ocimene with an aldehyde selected from the group consisting of formaldehyde and trioxymethylene, in a ratio of one mole of the terpene to an amount of the aldehyde equivalent to about three moles of formaldehyde, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

19. A resinous reaction product resulting from the process which comprises heating allo-ocimene with trioxymethylene in a molar ratio, the reaction being carried out at a temperature between about 50° C. and about 275° C. in the presence of a catalytic material selected from the group consisting of an inorganic acid, an unsubstituted organic carboxylic acid of between one and six carbon atoms, and an organic sulfonic acid.

20. A resinous reaction product resulting from the process which comprises heating allo-ocimene with trioxymethylene, in a molar ratio, in contact with acetic acid as a catalyst, at a temperature between about 50° C. and about 275° C.

21. A resinous reaction product resulting from the process which comprises heating allo-ocimene with trioxymethylene, in a molar ratio, in contact with para-toluene sulfonic acid as a catalyst, at a temperature between about 50° C. and about 275° C.

ALFRED L. RUMMELSBURG.